United States Patent [19]
Huang

[11] Patent Number: 5,708,536
[45] Date of Patent: Jan. 13, 1998

[54] RLL TO NRZ DECODER CIRCUIT IN DISK DRIVE READ/WRITE CHANNEL

[75] Inventor: Yihe Huang, Palo Alto, Calif.

[73] Assignee: Exar Corporation, San Jose, Calif.

[21] Appl. No.: 454,048

[22] Filed: May 30, 1995

[51] Int. Cl.$^6$ .................................................. G11B 5/09
[52] U.S. Cl. .......................... 360/40; 360/41; 360/51; 377/26; 377/68
[58] Field of Search ............................ 360/40, 41, 46, 360/51; 369/59, 60; 341/59, 68; 377/26, 67, 81, 68; 327/115, 117, 141, 154, 162, 174, 175, 176, 241

[56] References Cited

U.S. PATENT DOCUMENTS

| | | | |
|---|---|---|---|
| 4,675,652 | 6/1987 | Machado | 360/40 |
| 5,028,922 | 7/1991 | Huang | 360/48 |

Primary Examiner—Aristotelis M. Psitos
Assistant Examiner—Regina Y. Neal
Attorney, Agent, or Firm—Townsend and Townsend And Crew LLP

[57] ABSTRACT

The present invention is directed to a decoder circuit that can be operated at higher frequencies of a RLL clock. RLL data input from a disk drive is shifted through a first stage of the decoder circuit by the standard RLL clock. The RLL data is shifted from the first stage through a second stage of the decoder circuit by a modified RLL' clock that operates at a lower frequency than the RLL clock. In a preferred embodiment, RLL' clock operates at one-third the frequency of the RLL clock. The decoding step is accomplished within the period of one clock cycle of the slower RLL' clock, which affords the decoder circuit of the present invention a sufficient amount of time to decode the RLL data from the disk drive into NRZ data for the host. Since RLL' clock used in the decoding step is slower, the RLL clock used to generate RLL' clock and to clock data into the decoder circuit from the disk drive can be operated at a higher frequency than currently possible. This improvement in the speed of the RLL clock provides an improvement in the throughput of data from disk drive to host.

4 Claims, 5 Drawing Sheets

RLL TO NRZ DECODER CIRCUIT IN DISK DRIVE READ/WRITE CHANNEL

BACKGROUND OF THE INVENTION

The present invention relates generally to the read/write channel in a disk drive. More particularly, the invention is directed to a decoder circuit in the read/write channel for decoding RLL data stored on a head/disk assembly of a disk drive to NRZ data suitable for transfer to a host computer.

A typical computer system includes a host computer coupled to other system components by a system bus. The system component typically used for data storage is a disk drive. The operational circuitry for the disk drive would usually include a controller to control drive functions and read/write circuitry to transfer data between the host computer and the disk heads. Host computer data is typically encoded in a nonreturn to zero (NRZ) format, which is a method of coding data in which the signal representing binary digits alternates between a positive and zero voltage when there is a change in successive bits, either from a high (1) to a low (0), or vice versa. Disk data, on the other hand, is stored according to a run length limited (RLL) format, which is another method of coding data. RLL coding avoids the possibility of a data stream including a lengthy sequence of consecutive high or low signal values. RLL coding must be used in the disk drive because the phase-locked loop and automatic gain control circuitry used in storing data on and reading data from the disk require alternative high and low signals in order to provide accurate performance. For example, one possible RLL encoding scheme is RLL (1,7), which means that for every seven low signal values, there must be at least one high signal value.

Each data stream, NRZ data and RLL data, has its own clock for transferring data through the system, the NRZ clock and RLL clock, respectively. The RLL data from the disk surface and heads is decoded into NRZ data for the host in the read/write channel decoder circuitry. Current decoder circuits are limited in performance because the period of one RLL clock cycle must be sufficiently long enough to accommodate the decoding of RLL data to NRZ data. It would be preferable to operate the RLL clock at a high frequency so as to improve the throughput of data from disk drive to host. However, if the RLL clock is operated at too high a frequency, it is possible that the decoded NRZ data output will not accurately reflect the RLL data input.

Thus, it would be desirable to have a decoder circuit that can be operated at higher frequencies of the RLL clock.

SUMMARY OF THE INVENTION

The present invention is directed to a decoder circuit that can be operated at higher frequencies of a RLL clock. RLL data input from a disk drive is shifted through a first stage of the decoder circuit by the standard RLL clock. The RLL data is shifted from the first stage through a second stage of the decoder circuit by a modified RLL' clock that operates at a lower frequency than the RLL clock. In a preferred embodiment, RLL' clock operates at one-third the frequency of the RLL clock. The decoding step is accomplished within the period of one clock cycle of the slower RLL' clock, which affords the decoder circuit of the present invention a sufficient amount of time to decode the RLL data from the disk drive into NRZ data for the host. Since RLL' clock used in the decoding step is slower, the RLL clock used to generate RLL' clock and to clock data into the decoder circuit from the disk drive can be operated at a higher frequency than currently possible. This improvement in the speed of the RLL clock provides an improvement in the throughput of data from disk drive to host.

A further understanding of the nature and advantages of the inventions herein may be realized by reference to the remaining portions of the specification and the attached drawings.

DESCRIPTION OF THE PREFERRED EMBODIMENT

Figure 1:
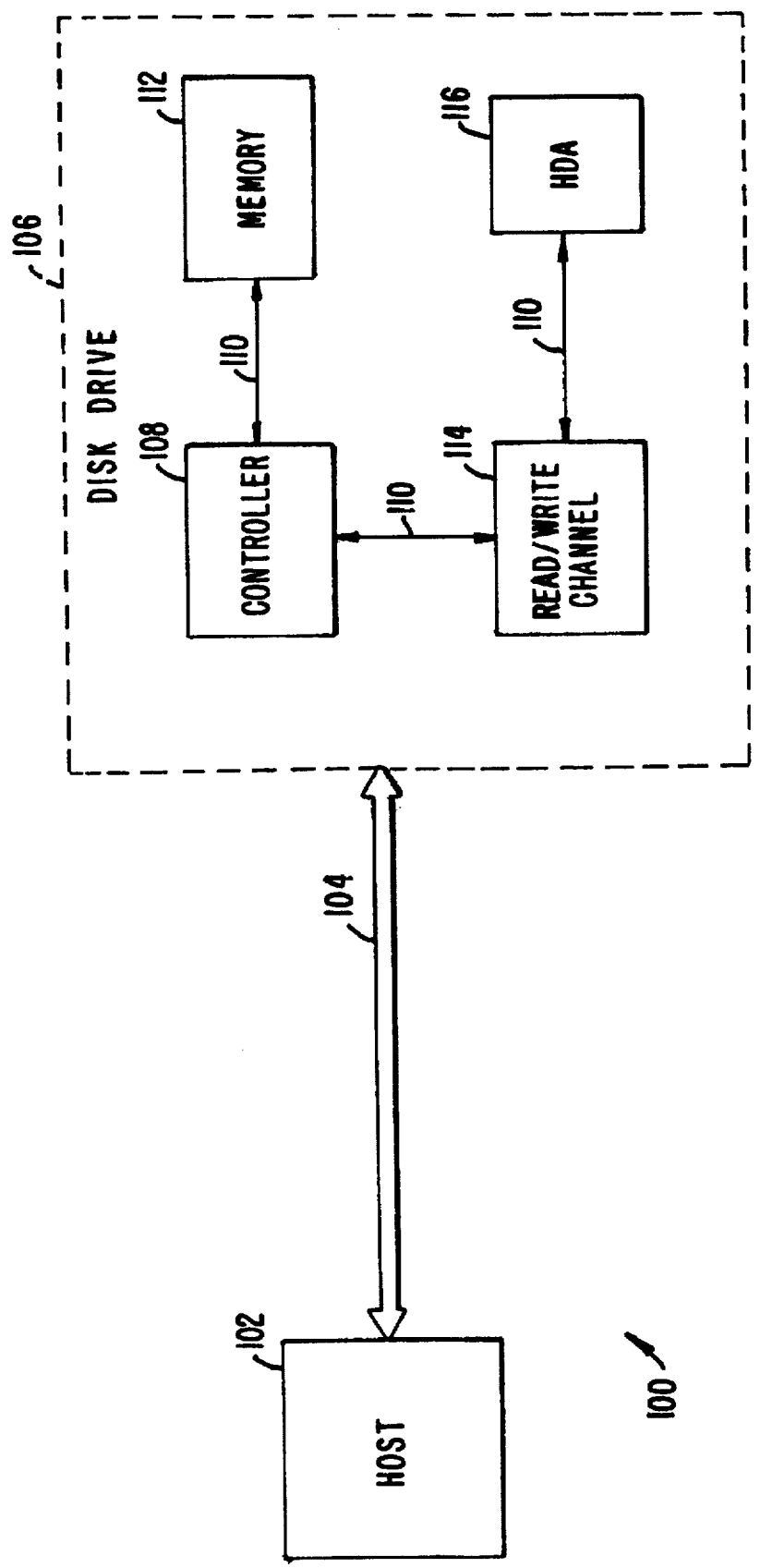
FIG. 1 is a simplified functional block diagram of a typical computer system including a host computer and a disk drive.

FIG. 1 is a simplified functional block diagram of a typical computer system 100, including a host computer 102 coupled to other system components by a system bus 104. A system component typically used for data storage is disk drive 106. The disk drive is controlled by a controller 108 that may be, for example, a microprocessor or dedicated control logic. Drive bus 110 couples controller 108 to other elements of the drive, such as memory 112. Data is transferred between host 102 and disk drive 106 through memory 112 under the control of controller 108. In executing a write operation, data is transferred by controller 108 from memory 112 through read/write channel 114 and written in the drive head/disk assembly (HDA) 116. In executing a read operation, data is read out of HDA 116 and again transferred through read/write channel 114 by controller 108.

Figure 2:
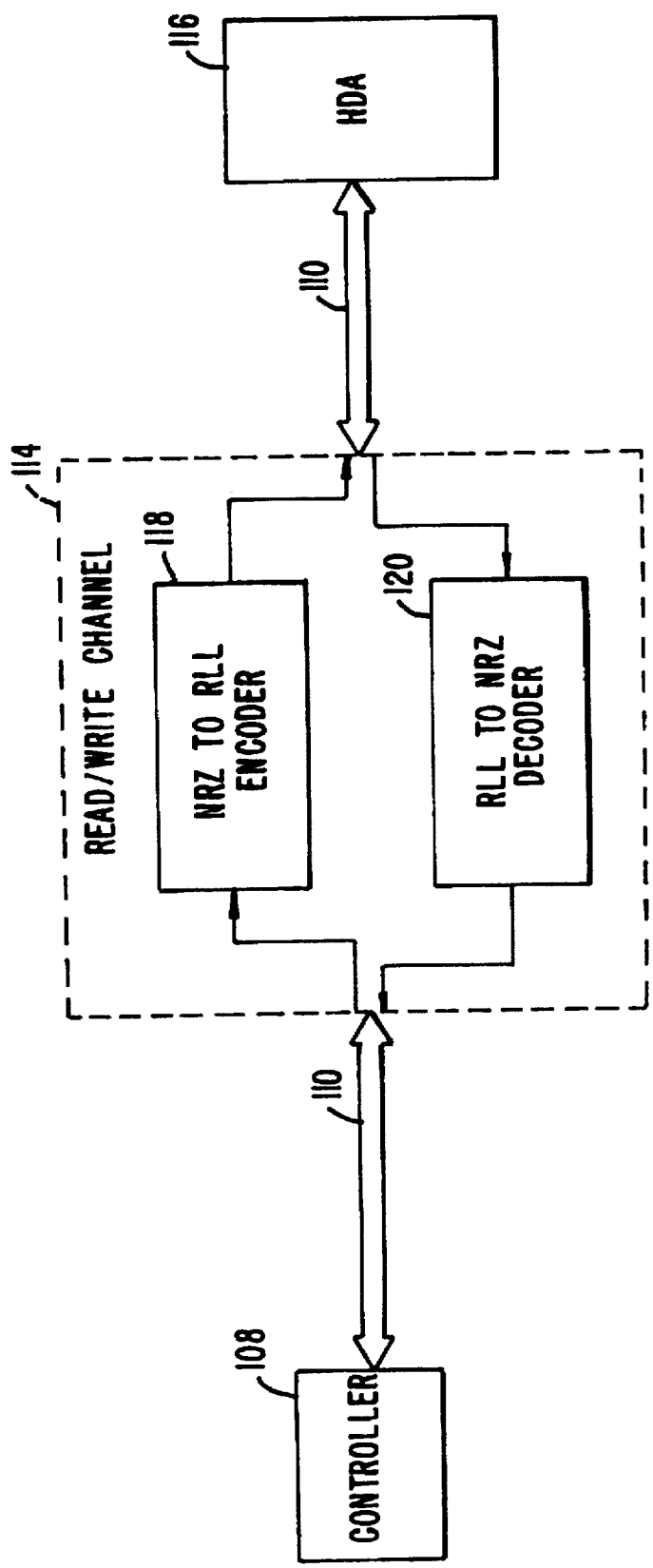
FIG. 2 is a simplified functional block diagram showing detail of the read/write channel of FIG. 1.

FIG. 2 is a simplified functional block diagram showing additional detail of read/write channel 114, which includes an encoder circuit 118 that encodes NRZ-coded data from the host into RLL-coded data that is stored in HDA 116, as well as a decoder circuit 120 that decodes RLL-coded data from HDA 116 back into NRZ-coded data to be read by the host. Decoder circuit 120 is operated by an RLL clock signal that is derived from the RLL-coded data.

Figure 3:
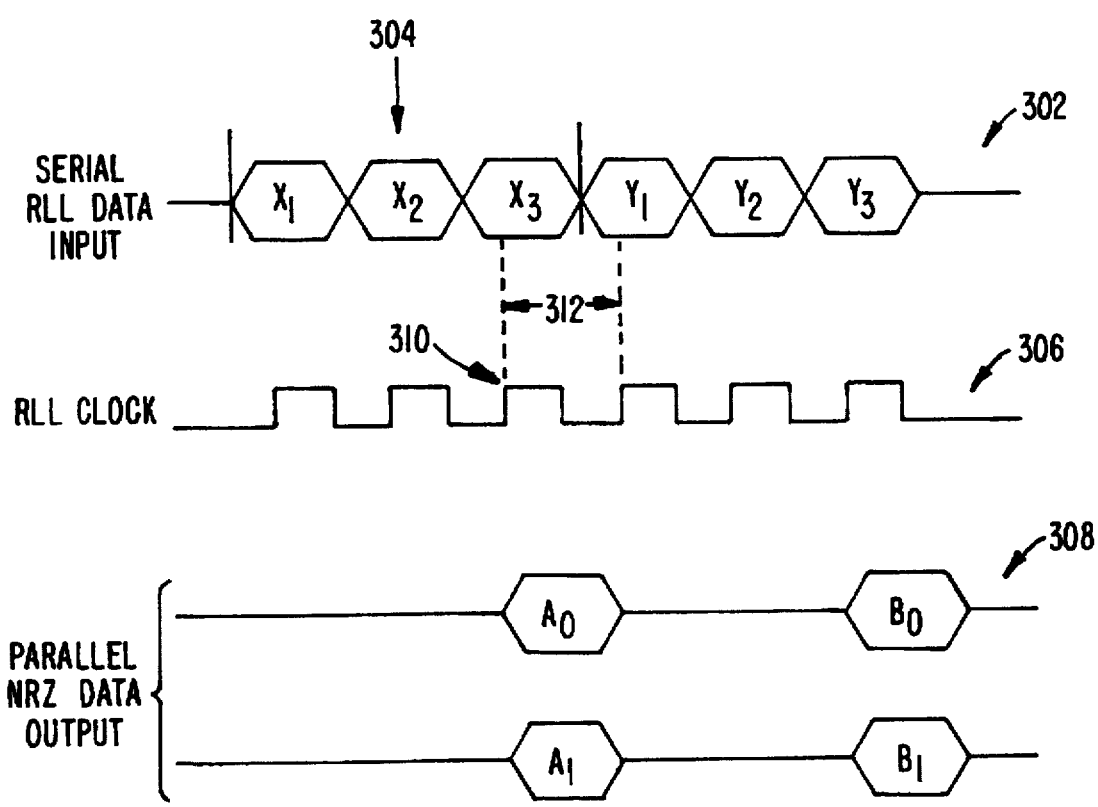
FIG. 3 is a timing diagram that shows the potential for the decoder circuit to experience failure at high frequencies of the RLL clock.

FIG. 3 is a timing diagram that shows the potential for the decoder circuit to experience failure at high frequencies of the RLL clock. RLL data 302 is input serially into the decoder circuit 120 (FIG. 2). In a preferred embodiment, for purposes of decoding the data, the decoding logic must read three RLL data bits and convert these bits into two parallel NRZ data bits. Thus, in the preferred embodiment, the serial RLL data has an intrinsic data window 304 of three bits, for example, $X_1$, $X_2$ and $X_3$. The data is clocked into the encoding logic by RLL clock 306. In order for decoder circuit 120 to decode all three RLL data bits $X_1$, $X_2$ and $X_3$ into two parallel NRZ data bits, the decoder must wait until all three bits in the RLL window 304 have been clocked into the decoder by RLL clock 306. Thus, the actual encoding step is performed after the third bit $X_3$ in data window 304 has been clocked into the decoding logic on edge 310 of RLL clock. Decoder circuit 120 outputs parallel NRZ data 308, which as noted above, yields two NRZ bits $A_0$ and $A_1$ for every three RLL bits $X_1$, $X_2$ and $X_3$. The NRZ data 308 is then clocked through the read/write channel 114 and in to host computer 102 (FIG. 2).

As can be seen in FIG. 3, reliable operation of decoder circuit 120 depends upon the length of the period of one clock cycle of RLL clock 306, specifically period 312 from edge 310 to the subsequent edge of RLL clock 306. If clock period 312 is too short for the decoding logic to perform the step of decoding the RLL input into NRZ output, the parallel NRZ output 308 could be incorrect, compromising the reliability of data stored on disk drive 106. The length of clock period 312 is dependent upon the process used to manufacture the circuitry. Merely by way of example, for a 1.2 μ CMOS process, the maximum clock frequency for RLL clock 306 is 70 MHz, which means the decoding period is 14 ns. In order to optimize operation of computer system 100 by maximizing the bit rate of data through decoder circuit 120, it would be desirable to operate RLL clock 306 at frequencies higher than currently possible. But the requirement that RLL clock must not exceed 70 MHz for a 1.2 μ CMOS process, for example, is a significant bottleneck in the operation of decoder circuit 120.

Figure 4:
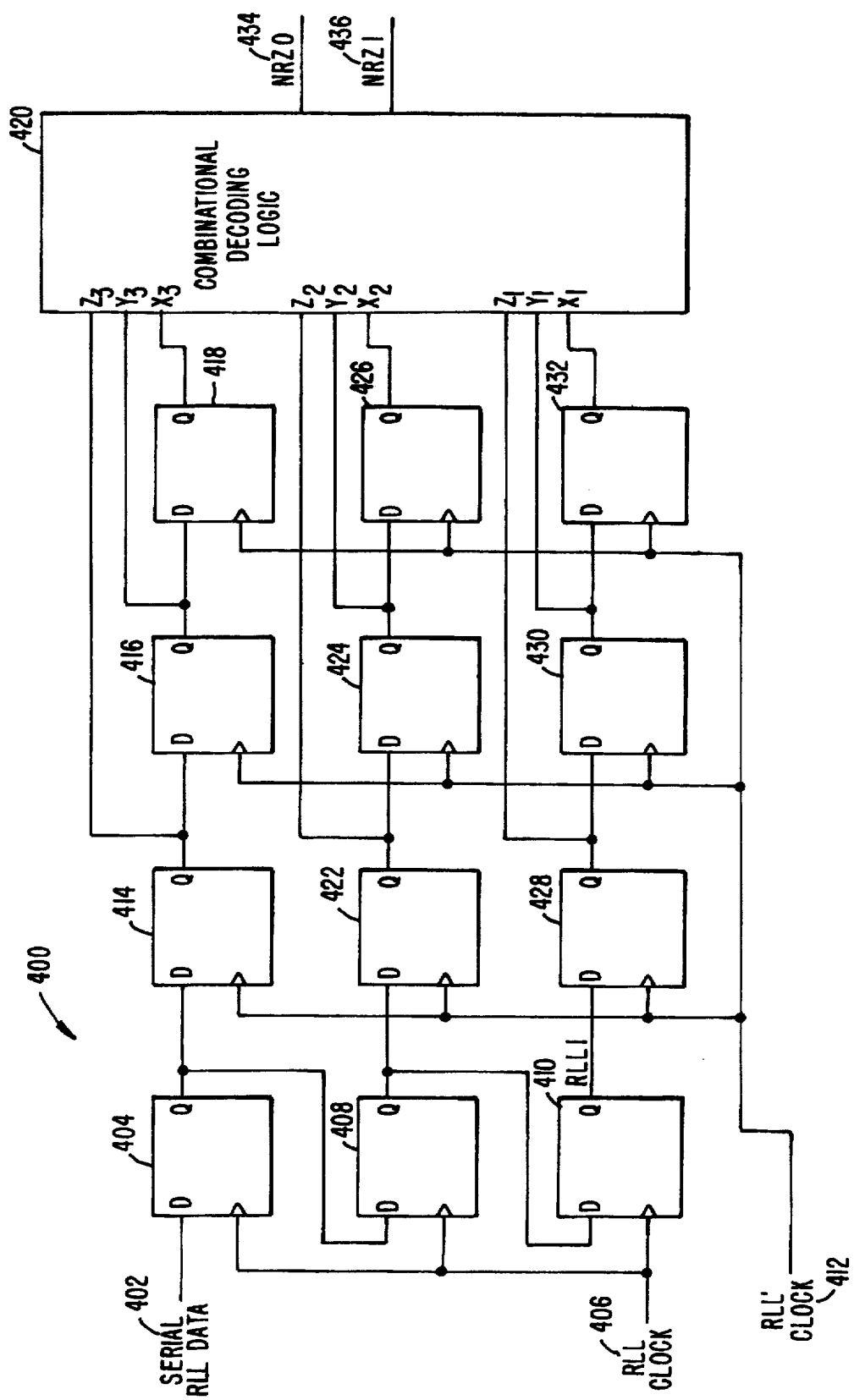
FIG. 4 is a simplified block diagram of the decoder circuit that decodes RLL data into NRZ data at high frequencies of the RLL clock.

FIG. 4 shows a simplified block diagram of a preferred embodiment of a circuit 400 included in decoder circuit 120 (FIG. 2) that decodes RLL data into NRZ data even at higher frequencies of the RLL clock. Serial RLL data stream 402 is input to flip-flop 404, which is clocked by an RLL clock 406 operating at a high frequency. The output RLL data of flip-flop 404 is input to flip-flop 408, and the output RLL data of flip-flop 408 is input to flip-flop 410. Both flip-flops 408 and 410 are also clocked by RLL clock 406. In a preferred embodiment, where serial RLL data 402 has an intrinsic data window of three bits, the outputs of flip-flops 404, 408 and 410 after three successive edges of RLL clock 406 will be the three bits in an RLL data window. This is signified in FIG. 4 by the notation RLL3 at the output of flip-flop 404, RLL2 at the output of flip-flop 408 and RLL1 at the output of flip-flop 410. Then, after three more RLL clock 406 signals, the three bits of the subsequent RLL data window will be at the outputs of flip-flops 404, 408 and 410, and so forth, converting serial RLL data input 402 into parallel RLL data bits.

At this point, rather than merely inputting the outputs of flip-flops 404, 408 and 410 to a decoding logic block, circuit 400 includes additional flip-flops that are clocked by an RLL' clock 412. In a preferred embodiment, RLL' clock 412 operates at one-third the frequency of RLL clock 406. The output bit RLL3 of flip-flop 404 is input to flip-flop 414, clocked by RLL' clock 412. The output signal of flip-flop 414 is input to flip-flop 416, and the output signal of flip-flop 416 is input to flip-flop 418. Again, both flip-flops 416 and 418 are clocked by RLL' clock 412. The output signal of flip-flop 418 is RLL bit $X_3$ that is input to a decoding logic block 420 that decodes RLL data into NRZ data. The remaining RLL bits in a data window, RLL2 and RLL1, are treated in a similar fashion. Specifically, the output bit RLL2 of flip-flop 408 is input to flip-flop 422, clocked by RLL' clock 412. The output signal of flip-flop 422 is input to flip-flop 424, and the output signal of flip-flop 424 is input to flip-flop 426. Again, both flip-flops 424 and 426 are clocked by RLL' clock 412. The output signal of flip-flop 426 is RLL bit $X_2$ that is input to decoding logic block 420. The output bit RLL1 of flip-flop 410 is input to flip-flop 428, clocked by RLL' clock 412. The output signal of flip-flop 428 is input to flip-flop 430, and the output signal of flip-flop 430 is input to flip-flop 432. Again, both flip-flops 430 and 432 are clocked by RLL' clock 412. The output signal of flip-flop 432 is RLL bit $X_1$ that is input to decoding logic 420.

Decoding logic block 420 actually receives inputs from all flip-flops clocked by RLL' clock 412 because, as understood by one skilled in the art, decoding logic block 420 requires information from three successive RLL data windows, or nine RLL bits in a preferred embodiment, to decode one RLL data window into a corresponding NRZ data window of two NRZ bits, NRZ0 data signal 434 and NRZ1 data signal 436. Therefore, the output $X_3$ bit of flip-flop 414 represents the RLL3 bit from a first RLL data window, an output $Y_3$ bit of flip-flop 416 represents the RLL3 bit from a second RLL data window and an output $Z_3$ bit of flip-flop 418 represents the RLL3 bit from a third RLL data window. Each of these bits are input to decoding logic block 420 so that the decoding logic receives information from three successive RLL data windows. The RLL2 and RLL1 bits from the other flip-flops clocked by RLL' clock 412 are treated similarly.

By sending the RLL data through the flip-flops clocked by a slower RLL' clock 412, the decoding logic 420 in decoder circuit 120 has a longer period of time in which to complete the step of decoding RLL data into NRZ data. Using a slower RLL' clock 412 to allow decoding logic 420 more time to complete the decoding step allows the base RLL clock 406 that clocks RLL data from the disk heads 116 through the read/write channel 114 to operate at much higher frequencies than currently possible. For example, in the preferred embodiment of the present invention, RLL clock 406 could operate at three times the frequency of the RLL clock in existing decoder circuits. This improvement still allows sufficient time for the decoding of RLL data to NRZ data. Because the decoding step is carried out under control of the slower RLL' clock 412, decoding logic 420 will still have the full period necessary to complete the decoding of RLL data to NRZ data. So, in the example described above, for a 1.2 μ CMOS process, decoding logic 420 would still have a period of 14 ns (70 MHz) to complete the decoding step, but RLL clock 406 would operate at three times that frequency (e.g. 210 MHz). Decoding circuit 120 will then no longer experience a bottleneck because of the RLL clock. It should be noted that after a certain point, the RLL clock frequency may not be the bottleneck in circuit operation any longer. Thus, though it is possible to operate RLL clock 406 at three times its previous frequency, it could be that portions of the system other than the decoder circuit 120 limit the clock frequency.

Figure 5:
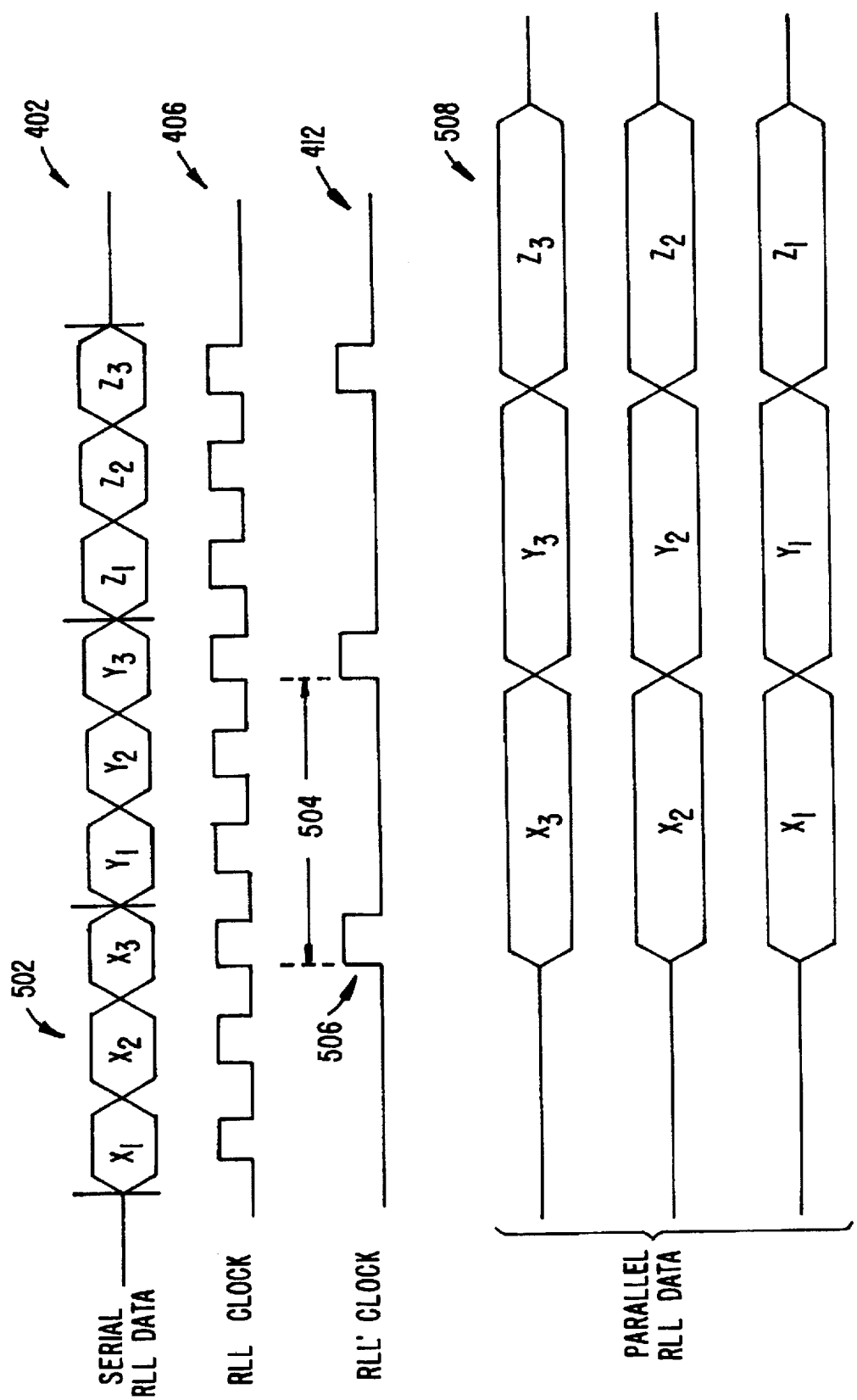
FIG. 5 is a timing diagram that shows the relationship of the data and clock signals shown in FIG. 4.

FIG. 5 is a timing diagram 500 that shows the relationship of the data and clock signals shown in FIG. 4. Serial RLL data signal 402 is shown in a preferred embodiment having an intrinsic data window 502 of three bits, $X_1$, $X_2$ and $X_3$, for example. RLL data 402 is clocked by RLL clock 406 from the disk heads 116 into read/write channel 114 and decoder circuit 120. As noted above, typical values for the RLL clock frequency are 210 MHz for a 1.2 μ CMOS process. The slower RLL' clock 412 is shown here in a preferred embodiment where RLL' clock 412 operates at one-third the frequency of RLL clock. 406. The length of the period of one clock cycle of RLL' clock 412, such as period 504 from edge 506 to the subsequent edge of RLL' clock 412, when compared to period 312 of FIG. 3, is sufficiently long for decoding logic 420 to complete the step of decoding the RLL input into NRZ output, even at higher frequencies of RLL clock 406. Parallel RLL data 508 is input to decoding logic 420 and is valid for the longer period 504 before data from the next window is clocked into decoding logic 420. As described above, three successive RLL data windows, including RLL data bits $X_1$, $X_2$, $X_3$, $Y_1$, $Y_2$, $Y_3$, $Z_1$, $Z_2$ and $Z_3$, are input to decoding logic block 420. Parallel data 508 is decoded by decoding logic 420 into corresponding NRZ data bits NRZ0 and NRZ1.

Again, by sending the parallel RLL data through the flip-flops clocked by a slower RLL' clock 412, rather than directly from flip-flops clocked by RLL clock 406, decoding logic 420 has a longer period 504 in which to complete the step of decoding parallel RLL data 508 into NRZ data. Using a slower RLL' clock 412 to allow decoding logic 420 more time to complete the decoding step allows the RLL clock 406 that clocks RLL data from the disk heads 116 through the read/write channel 114 to operate at much higher frequencies than currently possible. For example, in a preferred embodiment of the present invention, RLL clock 406 operates at three times the frequency of an RLL clock in existing decoder circuits. Therefore, RLL' clock 412 then operates at one-third the frequency of RLL clock 406, which still ensures that clock period 504 is long enough to complete the decoding of RLL data into NRZ data.

The present invention has now been explained with reference to specific embodiments. Other embodiments will be apparent to those of ordinary skill in the art. It is therefore not intended that this invention be limited except as indicated by the appended claims.

What is claimed is:

1. In a disk drive including a controller coupled to a read/write channel and a head/disk assembly, the read/write channel comprising:

a serial run-length limited (RLL) data input;

a first RLL clock input having a first frequency;

a first memory block coupled to said serial RLL data input and said first RLL clock input, said first memory block having a first parallel RLL data output, said first memory block further comprising:
   a first flip-flop coupled to said serial RLL data input and said first RLL clock input, said first flip-flop having an output;
   a second flip-flop coupled to said output of said first flip-flop and said first RLL clock input, said second flip-flop having an output; and
   a third flip-flop coupled to said output of said second flip-flop and said first RLL clock input, said third flip-flop having an output;

a second RLL clock input having a second frequency Q different from said first frequency;

a second memory block coupled to said first parallel RLL data output and said second RLL clock input, said second memory block having a second parallel RLL data output, said second memory block further comprising:
   a third memory block coupled to said first parallel RLL data output of said first memory block and said second RLL clock input, said third memory block having an output, said third memory block further comprising:
      a first flip-flop coupled to said output of said first flip-flop of said first memory block and said second RLL clock input, said first flip-flop having an output;
      a second flip-flop coupled to said output of said second flip-flop of said first memory block and said second RLL clock input, said second flip-flop having an output; and
      a third flip-flop coupled to said output of said third flip-flop of said first memory block and said second RLL clock input, said third flip-flop having an output;
   a fourth memory block coupled to said output of said third memory block and said second RLL clock input, said fourth memory block having an output, said fourth memory block comprising:
      a first flip-flop coupled to said output of said first flip-flop of said third memory block and said second RLL clock input, said first flip-flop having an output;
      a second flip-flop coupled to said output of said second flip-flop of said third memory block and said second RLL clock input, said second flip-flop having an output; and
      a third flip-flop coupled to said output of said third flip-flop of said third memory block and said second RLL clock input, said third flip-flop having an output;
   a fifth memory block coupled to said output of said fourth memory block and said second RLL clock input, said fifth memory block having an output, said fifth memory block comprising:
      a first flip-flop coupled to said output of said first flip-flop of said fourth memory block and said second RLL clock input, said first flip-flop having an output;
      a second flip-flop coupled to said output of said second flip-flop of said fourth memory block and said second RLL clock input, said second flip-flop having an output; and
      a third flip-flop coupled to said output of said third flip-flop of said fourth memory block and said second RLL clock input, said third flip-flop having an output.

2. In a disk drive including a controller coupled to a read/write channel and a head/disk assembly, the read/write channel comprising:

a serial run-length limited (RLL) data input;

a first RLL clock input having a first frequency;

a first memory block coupled to said serial RLL data input and said first RLL clock input, said first memory block having a first parallel RLL data output;

a second RLL clock input having a second frequency operating at one-third frequency of said first frequency; and a second memory block coupled to said first parallel RLL data output and said second RLL clock input, said second memory block having a second parallel RLL data output.

3. The read/write channel of claim 2 further comprising a decoding logic for converting said second parallel RLL data output into parallel nonreturn-to-zero (NRZ) data.

4. A method of encoding a serial run-length limited (RLL) data input into a parallel nonreturn-to-zero (NRZ) data output comprising the steps of:

clocking the serial RLL data input into a first memory block with a first RLL clock signal;

separating the serial RLL data input into three parallel RLL data signals;

clocking said three parallel RLL data signals into a second memory block with a second RLL clock signal operating at one-third frequency of said first RLL clock signal;

coupling said three parallel RLL data signals to a decoding logic block; and decoding said three parallel RLL data signals into two parallel NRZ data outputs.

\* \* \* \* \*